United States Patent
Weber

(10) Patent No.: US 10,807,845 B2
(45) Date of Patent: Oct. 20, 2020

(54) PALLET RACK MOVING SYSTEM

(71) Applicant: Glenn Weber, Los Angeles, CA (US)

(72) Inventor: Glenn Weber, Los Angeles, CA (US)

(*) Notice: Subject to any disclaimer, the term of this patent is extended or adjusted under 35 U.S.C. 154(b) by 0 days.

(21) Appl. No.: 15/582,510

(22) Filed: Apr. 28, 2017

(65) Prior Publication Data

US 2017/0313558 A1 Nov. 2, 2017

Related U.S. Application Data

(60) Provisional application No. 62/329,183, filed on Apr. 28, 2016.

(51) Int. Cl.
*B66F 3/08* (2006.01)
*B66D 1/66* (2006.01)
*B60D 1/66* (2006.01)

(52) U.S. Cl.
CPC ............... *B66F 3/08* (2013.01); *B60D 1/665* (2013.01); *B66D 1/66* (2013.01)

(58) Field of Classification Search
CPC ... B66F 3/08; B60D 1/66; B60D 1/665; B60S 9/08; B60S 9/18; B60S 9/22
USPC .... 108/53.1, 53.2, 51.11, 55.5, 57.17, 147.1, 108/147.11, 147.16; 254/420, 424
See application file for complete search history.

(56) References Cited

U.S. PATENT DOCUMENTS

| | | | | |
|---|---|---|---|---|
| 5,282,605 A * | 2/1994 | Sauber | ..................... | B60D 1/66 254/420 |
| 5,927,111 A * | 7/1999 | Nachbauer | .............. | F16K 35/10 137/382 |
| 6,644,626 B2 * | 11/2003 | Baril | ....................... | A47F 10/00 254/2 R |
| 8,596,613 B2 * | 12/2013 | Arensdorf | ............. | B62B 5/0086 254/10 B |
| 9,896,067 B2 * | 2/2018 | Okerlund | .................. | B60S 9/18 |
| 2008/0116434 A1 * | 5/2008 | Quarberg | ............... | B60D 1/246 254/420 |

OTHER PUBLICATIONS

Rivet Shelving & Pallet Rack Casters. Lift & Roll Your Warehouse Storage Shelving; model 1200 found at: https://vimeo.com/36857437.*
Rack Roller M4000 Lifting Caster found at: https://vimeo.com/189021398.*

(Continued)

*Primary Examiner* — Lee D Wilson
*Assistant Examiner* — Mahdi H Nejad
(74) *Attorney, Agent, or Firm* — Edwin Tarver

(57) ABSTRACT

An apparatus for lifting and moving a pallet rack includes a lifting portion and a supporting portion. The lifting portion and the supporting portion are in telescoping relation to each other and joined by a threaded rod. A swiveling caster is connected to the supporting portion, and a drive shaft is coupled to the threaded rod, with the drive shaft preferably extending out of the lifting portion. A vertical base plate is removably coupled to the lifting portion and includes at least one primary attachment point for attaching a bracket. The bracket is removably affixed to at least one primary attachment point, and preferably includes several secondary attachment points arranged to align with mounting points on the pallet rack so the pallet rack can be lifted by rotating the drive shaft.

12 Claims, 8 Drawing Sheets

(56) References Cited

OTHER PUBLICATIONS

Roller Industries website; rack rollers products (www.howdoimovemyshelving.com).*
Webker Construction (Rack Jax) Nov. 12, 2014 found at: https://www.yelp.com/biz/webker-construction-tarzana (Year: 2014).*
Roller Industries; the only way to move pallet rack/boltless shelving found at: https://www.howdoimovemyshelving.com/products (Year: 2016).*
U.S. Appl. No. 62/067,413 (Year: 2014).*
Boltless Shelving; Rack Roller M1200 Lifting Caster (Year: 2016).*

* cited by examiner

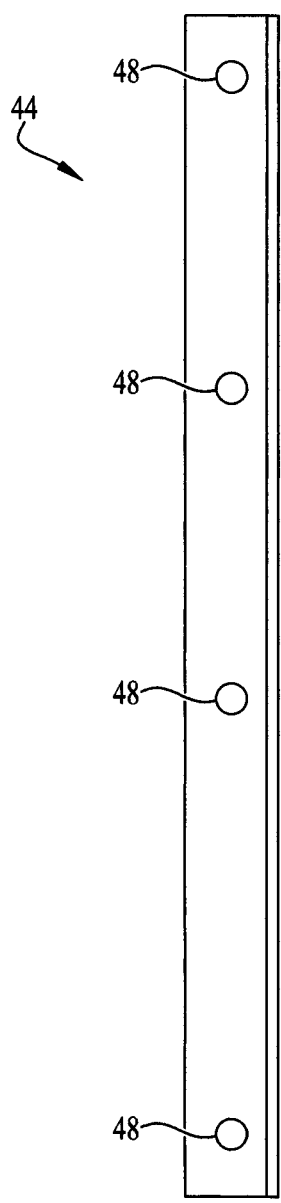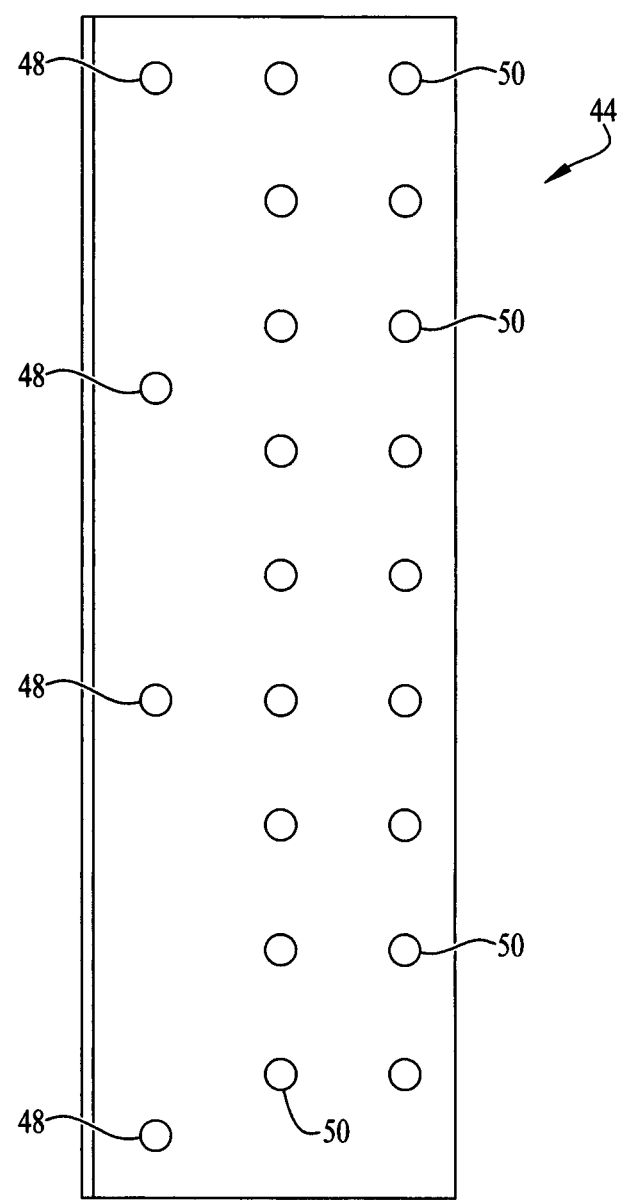
fig. 5A   fig. 5B
fig. 5C

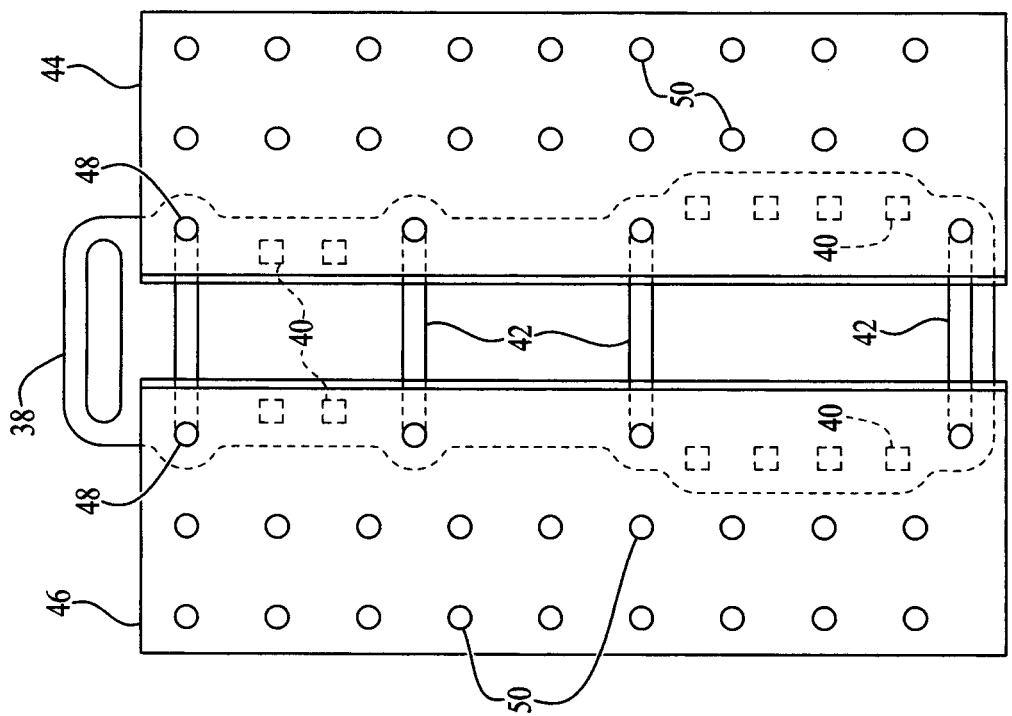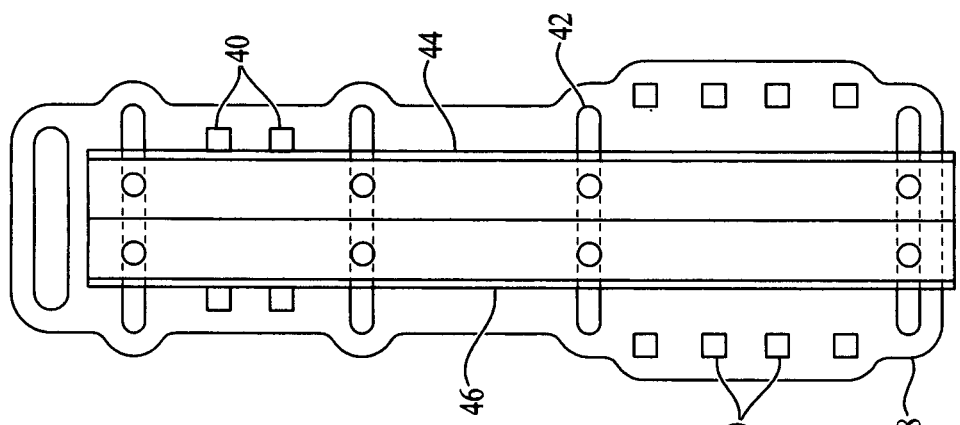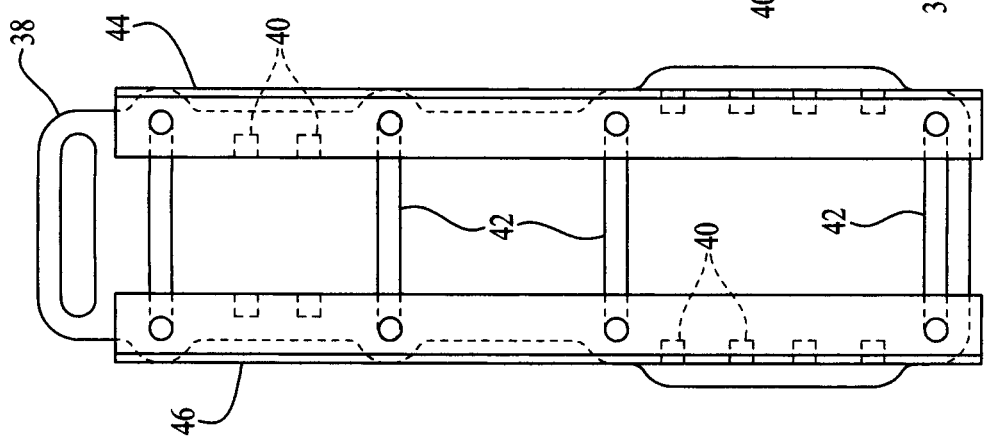

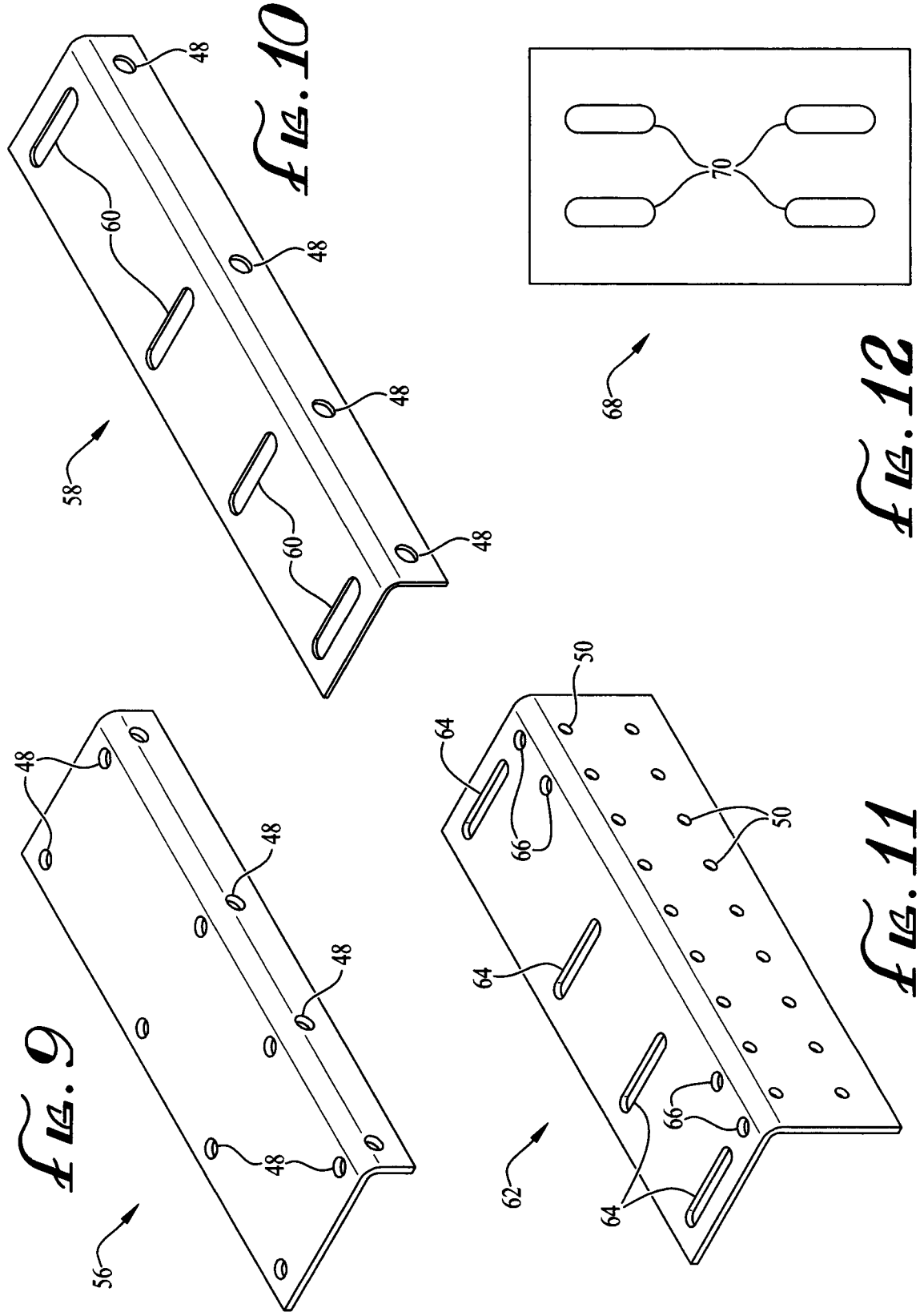

PALLET RACK MOVING SYSTEM

RELATED APPLICATIONS

This application claims the benefit of the priority filing date of U.S. provisional patent application Ser. No. 62/329,183, entitled "Pallet Rack Moving System," which was filed on 28 Apr. 20176.

BACKGROUND

Pallet racking systems ("pallet racks") are known in the art. A pallet rack comprises modular customizable rack assemblies, usually erected in large distribution warehouses. With customized assembly palletized material can be efficiently stored, and retrieved with a minimum of wasted space. When assembled, pallet rack allows side by side storage on several levels, easily accessible by forklift or similar vehicles. Occasionally pallet racks have wider shelving allowing pallets to be stored two or more deep. Pallet racks are virtually always arranged in longitudinal rows, with each row partially or completely spanning a warehouse. This allows fast convenient access to virtually any individual pallet in the warehouse.

Typical commercial logistics, despite detailed operational coordination, frequently result in a continuously changing demand for warehouse space. Additionally, since warehousing costs go down as the quantity of stored material (i.e., number of pallets stored in the warehouse) increases, there is an economic incentive to maintain warehouse storage as close to capacity as possible. Combined with fluctuating demand, these circumstances often result in insufficient, or inefficiently used storage space.

Obtaining larger warehouse facilities is disfavored. Aside from the cost of a particular facility itself, moving pallets of product from one warehouse to another presents numerous problems. Pallets must be inventoried, moved between facilities, re-stocked and re-inventoried. Usually, additional space for staging product to keep pallets organized and undamaged is required.

Since pallet racking is modular, it presents a partial solution when more storage space is needed. Rows of pallet rack can be disassembled, moved closer together, and reassembled to create more rows in the same area. Although avoiding the time and expense of procuring and moving to a new facility, the warehouse must still shut down, establish a staging area for warehoused product while keeping it undamaged and organized, and then re-stock and re-inventory everything. This process includes the added tasks of breaking down the existing pallet rack and reassembling it in a new configuration, or as is often the case, partially disassembling the pallet rack and dragging portions of it across the floor, which makes alignment very difficult and risks damage from torsion forces.

In order to move a standard sized row of back-to-back pallet rack, which represents two adjoining rows of approximately twenty one to twenty four bays, three to four levels high, it takes one day to unload the pallet rack, one day to move the pallet rack and anchor it in the new position, and one day to reinstall the stored product. The expense for such an endeavor in time, manpower, product damage and lost revenue can quickly run into hundreds of thousands, or even millions of dollars per day.

There is currently no easy method of moving industrial scale pallet rack installations. It is therefore an object of the present invention to reduce by seventy percent or more, the time required to rearrange pallet rack. Another object of the invention is to provide a pallet rack moving system allowing a row of pallet rack to be moved with minimal content removal, and without disassembling the pallet rack. Another object of the invention is to allow pallet rack to be moved in a stable manner, without excess movement other than lateral realignment of pallet rack rows. Another object of the invention is to allow pallet rack realignment in any direction along an X-Y plane. Yet another object of the invention is to provide a pallet rack moving system capable of interfacing with a wide variety of brands and types of pallet racks. These and other objects of the invention are more fully addressed herein.

SUMMARY

An apparatus for lifting and moving a pallet rack assembled with at least one upright frame or leg, the upright frame including mounting points. The apparatus includes a lifting portion and a supporting portion, the lifting portion and the supporting portion are preferably telescoping in relation to each other and are joined by a threaded rod, which is preferably disposed inside the lifting portion and the supporting portion. A swiveling caster is connected to the supporting portion, and a drive shaft is coupled to the threaded rod, with the drive shaft preferably extending out of the lifting portion.

A vertical base plate is removably coupled to the lifting portion. In addition to being coupled to the lifting portion, the vertical base plate also includes at least one primary attachment point for attaching one or more brackets. Each bracket is removably affixed to at least one primary attachment point, and each bracket preferably comprises a plurality of secondary attachment points. The secondary attachment points of the bracket are arranged on each bracket so that they align with at least one of the mounting points, and preferably multiple mounting points on the upright frame of the pallet rack. Thus, when the bracket is positioned adjacent the upright frame, with the secondary attachment points arranged on bracket such that at least one, and preferably more, of the plurality of secondary attachment points aligns with at least one of the mounting points, the pallet rack can be lifted by rotating the drive shaft.

In various alternative embodiments, the lifting portion may comprise or be formed as an outer tube and the supporting portion may comprises or be formed as an inner tube, with the inner tube and the outer tube disposed in a telescoping arrangement relative to each other. To engage the threaded rod, the supporting portion may comprise a threaded nut through which the threaded rod rotates, thereby moving the rod longitudinally relative to the supporting portion. In order to move the lifting portion relative to the supporting portion, a thrust bearing may be provided, the thrust bearing longitudinally fixed along the threaded rod adjacent the lifting portion, and able to rotate about the threaded rod.

In various other embodiments, the apparatus may include a locking pin for anchoring the swiveling caster in the supporting portion. The drive shaft may extent directly through the lifting portion, allowing a user to engage the drive shaft and rotate the threaded rod inside the supporting portion. For added support, the lifting portion may include anchoring members to which the base plate is removably coupled. In one embodiment, the anchoring members extend from the lifting portion transverse to the threaded rod. The primary attachment point of the vertical base plate may include a slot allowing the bracket to slide relative to the base plate, and in preferred embodiments, the bracket may be an L-bracket.

The apparatus may also be characterized as an apparatus for lifting and moving a pallet rack assembled with at least one upright frame having mounting points, with the apparatus comprising an outer telescoping tube and an inner telescoping tube, the inner telescoping tube comprising a lifting nut. A threaded rod extends through the lifting nut and the outer telescoping tube. A swiveling caster is coupled to the inner telescoping tube, and a thrust bearing is affixed to the threaded rod, the thrust bearing forming a shoulder for driving the outer telescoping tube An actuator is coupled to the threaded rod, with the actuator imparting rotational movement to the threaded rod, and a base plate is removably coupled to the outer telescoping tube. The base plate includes a series of bolt holes, and a bracket is removably affixed to the at base plate, the bracket comprising a plurality of base plate attachment points. The bracket also has a plurality of bracket attachment points, and the plurality of bracket attachment points are arranged on bracket such that at least one of them aligns with at least one of the mounting points on the pallet rack when the bracket is positioned adjacent the upright frame.

In various embodiments, the base plate may comprise attachment slots allowing the bracket to slide along the base plate without decoupling from the base plate. The outer telescoping tube comprises anchoring members for attaching to the base plate, and may comprise an upper anchoring member and a lower anchoring member for attaching to the base plate. Preferably the bracket is an L-bracket, and multiple brackets, including a left side L-bracket and a right side L-bracket may be included with the apparatus. An extension panel may be included having panel slots for engaging the bracket and the base plate. A pin may be included for removing the swiveling caster. A drive shaft may couple the actuator to the threaded rod.

Finally, the apparatus may be characterized as an apparatus for lifting and moving a pallet rack assembled with at least one upright frame having mounting points, with the apparatus comprising an outer telescoping tube and an inner telescoping tube, the inner telescoping tube comprising a lifting nut, a threaded rod for engaging the lifting nut, the threaded rod further comprising a thrust bearing coupled to the threaded rod, such that rotating the threaded rod drives the lifting nut away from the thrust bearing. A removable swiveling caster is coupled to the inner telescoping tube. An actuator is coupled to the threaded rod, with the actuator extending from the outer telescoping tube opposite the removable swiveling caster and configured to impart rotational movement to the threaded rod.

The outer telescoping tube further comprises an anchoring member extending from the outer telescoping tube perpendicular to the threaded rod. A base plate is removably coupled to the anchoring member, with the base plate having a series of bolt holes, and a bracket is removably affixed to the base plate. The bracket comprises a plurality of base plate attachment points, and also has a plurality of bracket attachment points. The plurality of bracket attachment points are arranged on bracket such that at least one of the plurality of bracket attachment points aligns with at least one of the mounting points when the bracket is positioned adjacent the upright frame.

BRIEF DESCRIPTION OF THE FIGURES

FIG. 5A illustrates a side view of a right side L-bracket, being a mirror image of a left side L-bracket (not shown);

FIG. 5B illustrates a plan view of the right side L-bracket, being a mirror image of the left side L-bracket;

FIG. 5C illustrates a top view of the right side L-bracket, being a mirror image of the left side L-bracket;

FIG. 7A illustrates the right side L-bracket installed on the base plate;

FIG. 7B illustrates the left side L-bracket installed on the base plate;

FIG. 8 illustrates a plan view of the base plate with the right side L-bracket and the left side L-bracket in a coplanar orientation;

FIG. 9 illustrates a perspective view of an L-extension bracket for customizing the pallet rack moving system;

FIG. 10 illustrates a perspective view of a slotted L-extension bracket for further customizing the pallet rack moving system;

FIG. 11 illustrates a perspective view of an extended L-bracket for allowing an extended connection between the jack and a pallet rack to be established;

FIG. 12 illustrates a plan view of an extension panel for stabilizing the connection between the jack and a leg of a pallet rack.

DETAILED DESCRIPTION

The following description is presented to enable any person skilled in the art to make and use the invention, and is provided n the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
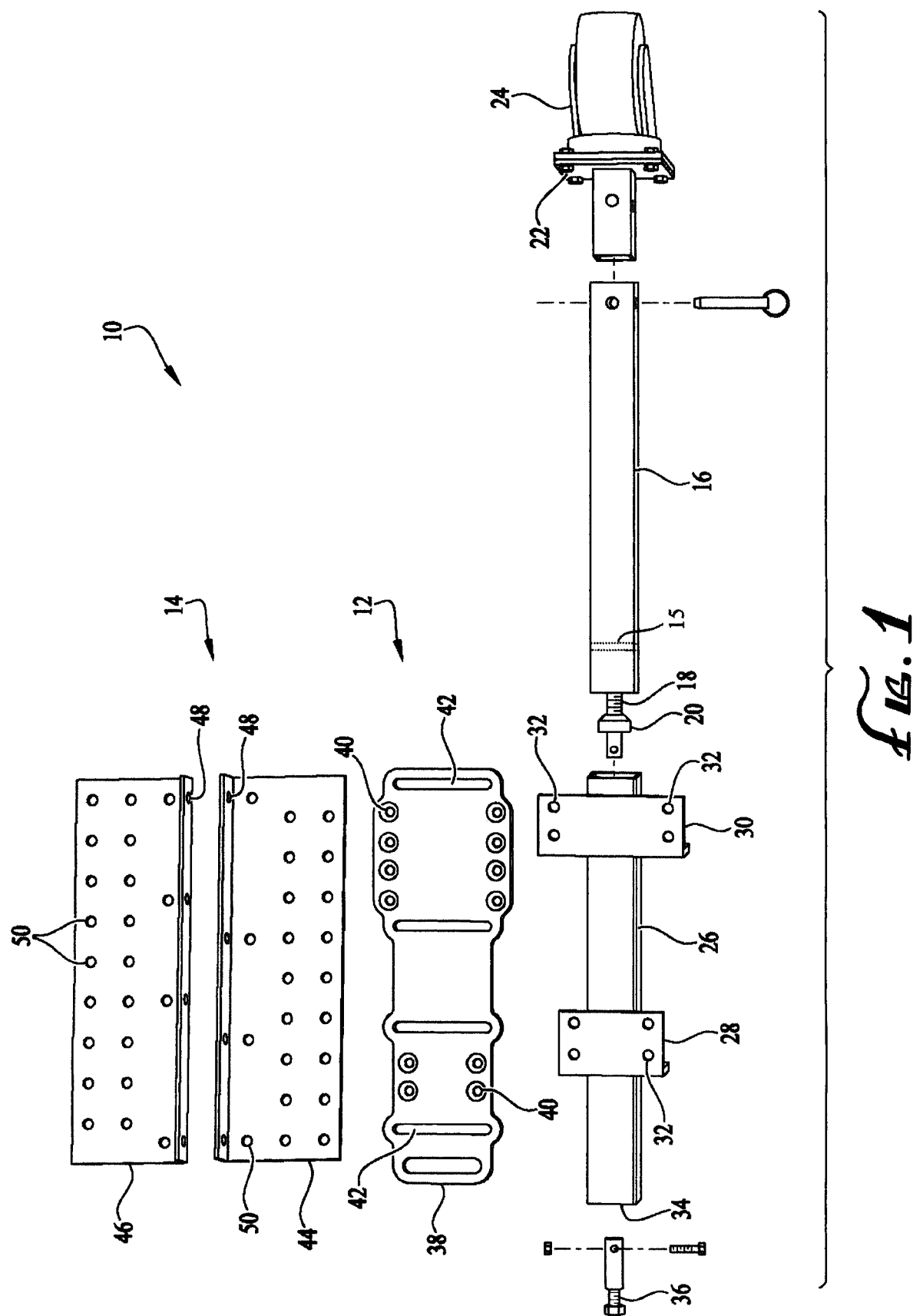
FIG. 1 illustrates an exploded view of a jack for lifting pallet racks.

Referring to FIG. 1, an exploded view of the pallet rack jack 10 is shown. The jack 10 includes a lifting assembly 12 for elevating a pallet rack (not shown) and a securing assembly 14 for attaching the jack 10 to one or more legs of a pallet rack.

The lifting assembly 12 comprises a conventional screw jack assembly, including an inner telescoping tube 16 housed within an outer telescoping tube 26. The inner telescoping tube houses a lifting or threaded nut 15, through which a leadscrew 18 extends. The leadscrew 18 includes a thrust bearing 20 for engaging the outer telescoping tube 26. At one end, the inner telescoping tube 16 is fitted with a removable bottom plate 22 coupled to a swiveling caster 24.

The outer telescoping tube 26 is open at one end to accommodate the inner telescoping tube 16 in a substantially frictionless linear sliding arrangement. The outer telescoping tube 26 includes an upper anchoring member 28 and a lower anchoring member 30 coupled to its exterior. Although the illustrated embodiment shows only upper 28 and lower 30 anchoring members, additional embodiments may include one, three, or more anchoring members as needed. The upper anchoring member 28 and lower anchoring member 30 are preferably perpendicular to, and overhang the outer telescoping tube 26 sufficient to accommodate a plurality of through holes on opposing sides of the outer telescoping tube 26.

An end plate 34 is affixed to one end of the outer telescoping tube 26 for engaging the thrust bearing, and through which the leadscrew 18 extends. Beyond the end plate 34, the leadscrew 18 engages an actuator 36 for imparting rotational movement to the leadscrew 18. In one embodiment, the actuator may comprise a conventional hex nut top allowing a socket wrench or similar type of removable mechanism for applying torque to the actuator 36.

The securing assembly includes a base plate 38 which is coupled to the outer telescoping tube 26. The base plate 38 includes a series of bolt holes 40 for attaching the base plate 38 to the upper anchoring member 28 and the lower anchoring member 30 using bolts (not shown) or a similar type of removable fastener. The base plate 38 also includes a series of attachment slots 42. The attachment slots 42 allow the base plate 38 to be coupled to one of a variety of modular structures. In the illustrated embodiment, a right side L-bracket 44 and a left side I-bracket 46 are shown.

The right side L-bracket 44 and the left side L-bracket 46 include a series of base plate attachment points 48 and a series of bracket attachment points 50. The base plate attachment points 48 allow the right side L-bracket 44 to be installed along an exposed section of an attachment slot 42 to the right of the outer telescoping tube 26, and the left side L-bracket 46 to be installed along an exposed section of an attachment slot 42 to the left of the outer telescoping tube 26. Due to the elongated nature of the attachment slots 42, the rights side L-bracket 44 and the left side L-bracket may be arranged so that they closely conform to a leg of a pallet rack for attachment and lifting.

Figure 2:
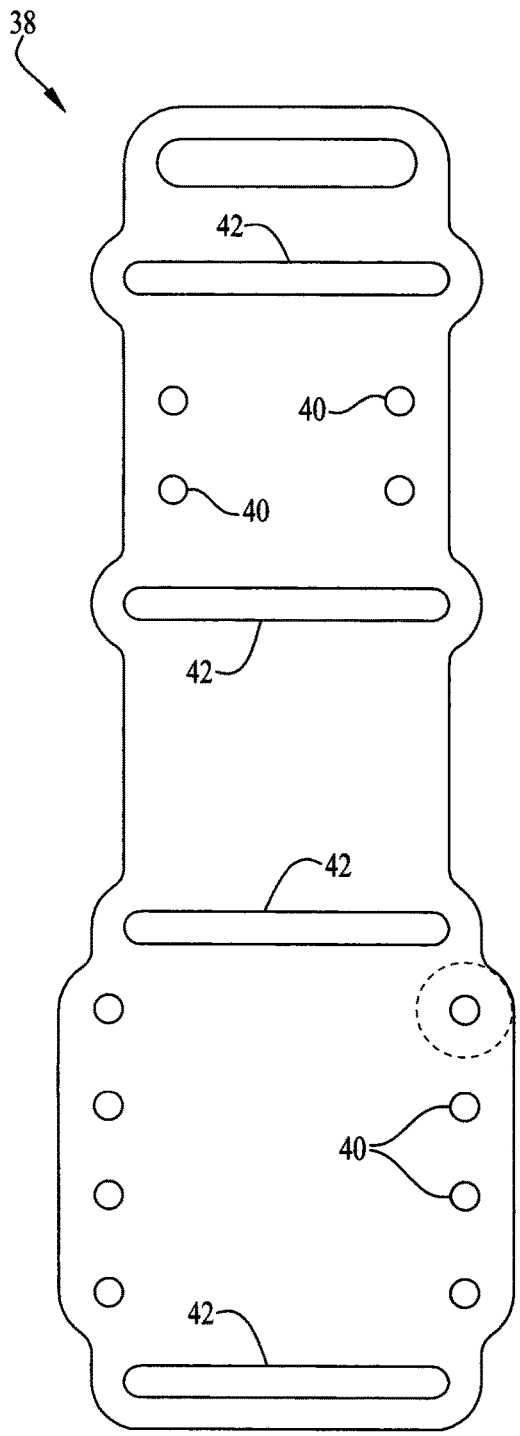
FIG. 2 illustrates a plan view of a base plate.

Referring to FIG. 2, the base plate 38 is shown in plan view according to a preferred embodiment. The base plate 38 is preferably a substantially planar member having, as discussed, a plurality of bolt holes 40 and a plurality of attachment slots 42. The bolt holes are positioned to match up with the through holes 32 of the upper attachment member 28 (not shown) and the lower attachment member 30.

For attachment to the upper attachment member 28, four bolt holes 40 are shown, spaced apart substantially 1⅜ inches from top to bottom and 3½ inches from side to side. For attachment to the lower attachment member 30, eight bolt holes 40 are shown in two columns spaces substantially 5½ inches apart. Although a specific spacing of the bolt holes 40 is shown, alternative embodiments may comprise any spacing pattern that affixes the base plate 38 to the lifting assembly 12 in a matter sufficient for bearing the load of a pallet rack.

Still referring to FIG. 2, the base plate 38 attachment slots 42 are horizontally oriented, and arranged vertically with a predetermined amount of space between each attachment slot 42. Importantly, the attachment slots 42 are spaced such that they occur above and below the upper attachment member 28 and the lower attachment member 30, but are not obstructed by either structure. The attachment slots 42 are preferably at least five inches in length, allowing modular structures, such as the L-brackets 44/46 to be installed at a desired width. By locating the attachment slots 42 near the attachment members 28/30, the base plate 38 will be more resilient to bending under lateral forces due to the weight of a pallet rack.

Figure 3:
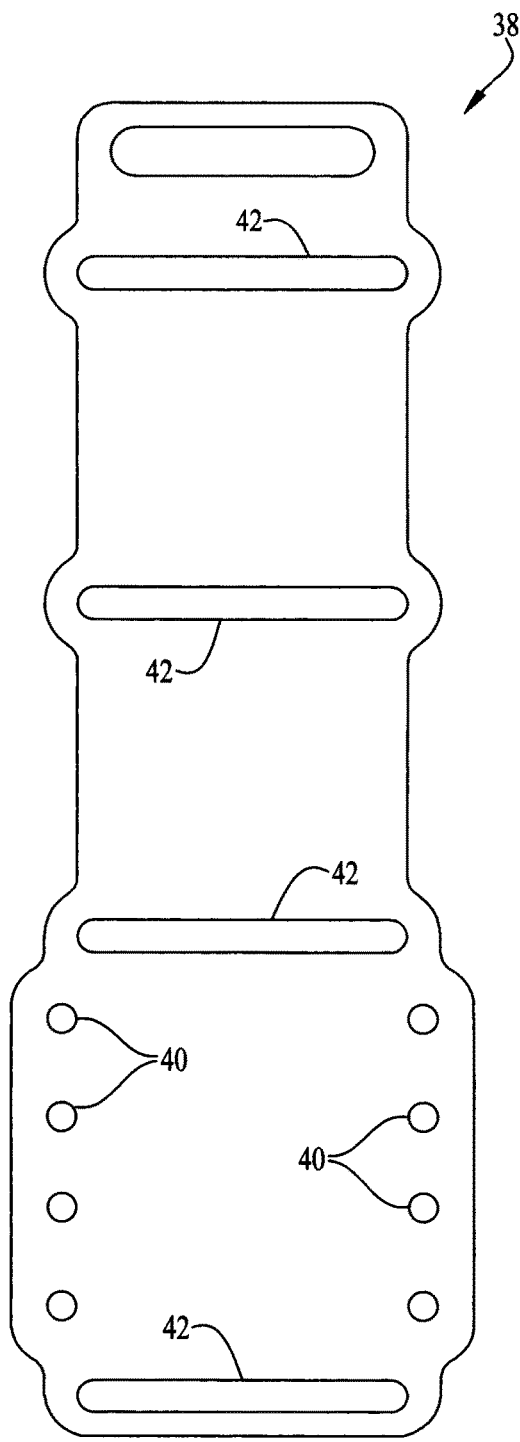
FIG. 3 illustrates a plan view of a first alternative embodiment base plate.
Figure 4:
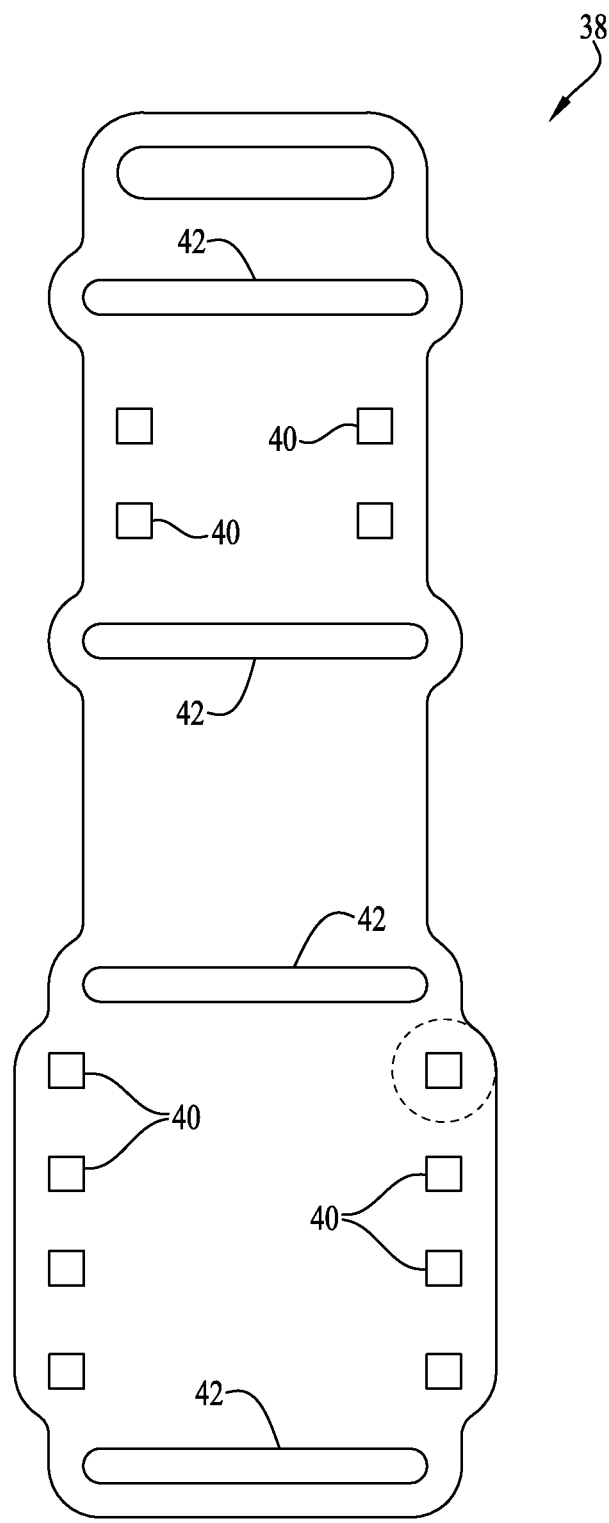
FIG. 4 illustrates a plan view of a second alternative embodiment base plate.

Referring to FIGS. 3 and 4, two alternative embodiment base plates 38 are shown. Referring to FIG. 3, a base plate 38 is shown having only one series of bolt holes 40 corresponding, for example, to the lower attachment member 30 (not shown). This arrangement preserves the spacing of the first embodiment base plate 38 shown in FIG. 2. Referring to FIG. 4, a second alternative embodiment base plate 38 is shown. In this embodiment, the bolt holes 40 have been squared to accommodate carriage bolts. Due to the modular nature of the jack 10, employing carriage bolts, or a similar type of self-anchoring bolt helps to speed up attachment and disassembly of the jack 10 and its component parts.

FIGS. 5A-5C shows a right side L-bracket 44 from a variety of views. The left side L-bracket 46 (not shown) is substantially a mirror image of the right side L-bracket 44, having the same features. The right side L-bracket 44 includes two panels disposed at substantially ninety degrees relative to one another, one panel being smaller than the other. A series of base plate attachment points 48 are disposed on the smaller panel, adapted to be affixed to the attachment slots 42 of the base plate 38. In this manner, the larger panel will be perpendicular from the base plate 38 extending away from it to engage a pallet rack leg 52 (not shown). There are a number of bracket attachment points 50. In the illustrated embodiment two parallel columns of bracket attachment points 50 are shown for attaching to a pallet rack leg 52 in a variety of places.

Figure 6:
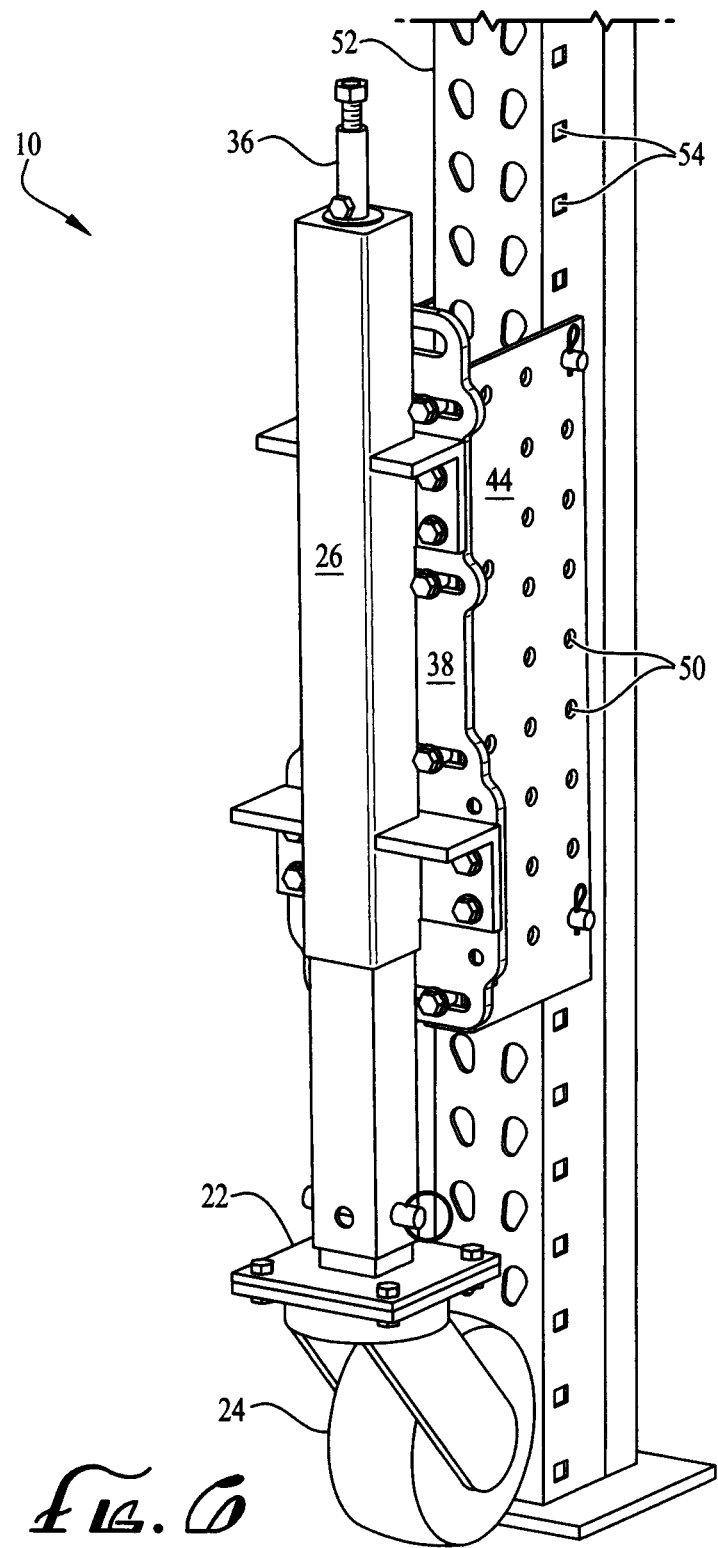
FIG. 6 illustrates a perspective view of the jack installed on a pallet rack leg.
Figure 13:
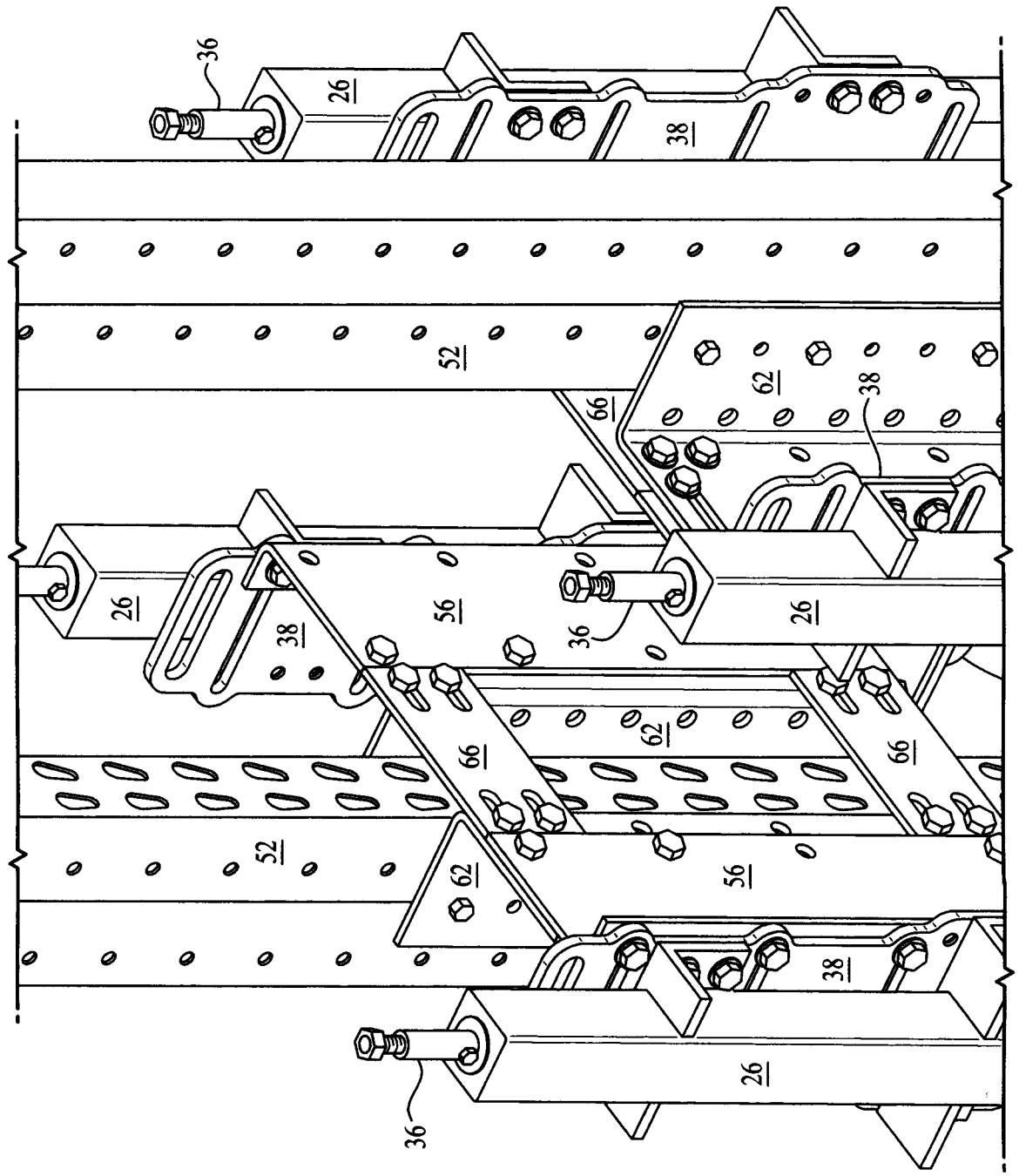
FIG. 13 illustrates a perspective view of several jacks installed on several pallet rack legs.

FIG. 6 shows an assembled jack 10 affixed to a pallet rack leg 52 prior to lifting a pallet rack. As described, the right side L-bracket extends away from the base plate 38, and engages the pallet rack leg 52. Since pallet rack legs 52 typically have a series of eye holes 54, for attaching pallet shelving (not shown), or attaching items to the pallet rack leg 52, a pin or similar fastener may engage the pallet rack leg 52, extending through the right side L-bracket 44 to the left side L-bracket 46 (not shown). The L-brackets are affixed to the base plate 38, which is affixed to the outer telescoping arm 26. When the actuator 36 is engaged, the outer telescoping arm 26 and the pallet rack leg 52 are raised off the floor, supported by the bottom plate 22 and caster 24. Because virtually all pallet rack legs 52 include eye holes 54, the system works with any rack system including structural racking.

Referring to FIGS. 7A and 7B, by providing attachment slots 42 on the base plate 38, as opposed to attachment points, the rights side L-bracket 44 and left side L-bracket 46 can be adjusted as needed to bring them directly against a pallet rack leg 52 (not shown).

Referring to FIG. 8, the right side L-bracket 44 and left side L-bracket 46 are attached to the base plate 38 in a manner such that the bracket attachment points 50 extend laterally away from the base plate 38 by using the base plate attachment points 48 on the larger portion of the L-brackets. This configuration is useful when two or more pallet rack legs 52 (not shown) need to be lifted by a single jack 10. When mounted thusly, the right side L-bracket 44 and left side L-bracket 46 may not directly engage a pallet rack leg 52, and instead may be coupled to additional ancillary brackets.

Referring to FIG. 9, if the right and left side L-brackets 44/46 are not used to directly engage a pallet rack leg 52, one or more L-extensions 56 may be used. The L-extension 56 includes base plate attachment points 48 on two perpendicular sides. In this manner, the L-extension 56 may be attached to the base plate 38 (not shown) and right and left side L-brackets 44/46 attached to the L-extension 56. Because the L-extension includes two perpendicular sides like the rights and left side L-brackets 44/46, a variety of shapes can be created.

Referring to FIG. 10, to add more flexibility, a slotted L-extension 58 may be used complimentary with or in place of the L-extension 56 shown in FIG. 9. The slotted L-extension 58 is also a two panel member but includes L-extension slots 60 in place of the base plate attachment points 48 on the larger panel. In the illustrated embodiment, base plate attachment points 48 remain on the smaller panel of the slotted L-extension 56. In this manner, the L-extension slots 60 may be use adjacent the base plate 38 (not shown), a right or left side L-bracket 44/46 (not shown), an L-extension 56 (FIG. 9) or another slotted L-extension 58 for attaching to a wide variety of pallet rack types.

Referring to FIG. 11, in addition to the extensions shown in FIGS. 9 and 10, the jack 10 may include one or more extended L-brackets 62 (including right side and left side extended L-brackets 62) for more flexibility in attaching to a pallet rack leg 52 (not shown). The extended L-brackets 62 include bracket attachment points 50 for attaching to the pallet rack leg 52, and base plate attachment slots 64, like the slotted L-extension 58 (FIG. 10). In addition, the extended L-bracket 62 includes extension panel attachment points 66 for affixing an extension panel 68 (shown in FIG. 12) to the extended L-bracket 62.

Referring to FIG. 12, when a variety of structures are affixed in series to the base plate 38 (not shown), there may be a risk of instability, due to strong gravitational torsion forces acting on the jack when a pallet rack is lifted. For this reason, an extension panel 68 standardized to connect various structures (e.g., the right side L-bracket 44, left side L-bracket 46, L-extension 56, slotted L-extension 60, extended L-bracket, etc.) The extension panel 68 is preferably a planar panel having extension panel slots 68 positioned on its surface to anchor the aforementioned structures together. Using the various panels, extensions, and extension panel 68, the jack 10 may be customized to affix to a wide variety of pallet racks.

Depending on the weight of a pallet rack and the arrangement of its legs 52, two or more jacks 10 may be used to lift a single pallet rack leg 52. Two jacks 10 may be affixed to each pallet rack leg 52 using L-extensions 56, extended L-brackets 62, and extension panels 66. Because the jacks 10 can hold substantial weight, pallet racks may be moved without taking products off the shelves. In addition to the speed and convenience of not having to restock product, this allows warehouse owners to quickly reconfigure racks to keep up with SKU growth, and to leave rack labeling in place to save time. An example of such an application would be a freezer warehouse where the product has to stay in place during the reconfiguration.

Using only a few jacks 10, large lengths of pallet rack may be easily and quickly moved without the time and expense of removing items or pallets, or disassembling the rack. Because the jacks 10 are small and modular, they may be conveniently stored and easily transported from jobsite to jobsite.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for lifting and moving a pallet rack having at least one upright frame with mounting points, the apparatus comprising:
   an inner lifting tube and an outer supporting tube, the inner lifting tube and the outer supporting tube joined by a threaded rod;
   a swiveling caster connected to the inner lifting tube, the swiveling caster comprising a wheel;
   a drive shaft coupled to the threaded rod;
   the outer supporting tube having a planar upper anchoring member affixed directly to the outer supporting tube and a planar lower anchoring member affixed directly to the outer supporting tube, the planar lower anchoring member larger than the upper anchoring member, and the planar upper anchoring member and the planar lower anchoring member disposed apart from each other along the outer supporting tube;
   a flat vertical planar base plate removably coupled to the upper anchoring member and the lower anchoring member, the flat planar vertical base plate having a plurality of attachment points configured for fixing the flat planar vertical base plate to both the planar upper anchoring member and the planar lower anchoring member, and having a plurality of slots;
   a first L bracket comprising a first planar face and a second planar face perpendicular to the first planar face, the first planar face comprising a plurality of L bracket attachment points configured for attachment to the slots; and
   a second L bracket comprising a third planar face and a fourth planar face perpendicular to the third planar face, the third planar face comprising a plurality of L bracket attachment points configured for attachment to the slots.

2. The apparatus of claim 1 further comprising a threaded nut affixed to the inner lifting tube, the threaded nut rotationally engaging the threaded rod.

3. The apparatus of claim 1 further comprising a thrust bearing longitudinally fixed along the threaded rod.

4. The apparatus of claim 1 further comprising a locking pin for anchoring the swiveling caster in the inner lifting tube.

5. The apparatus of claim 1 wherein the plurality of slots of the vertical base plate comprises four slots allowing the first L-bracket and the second L-bracket to slide relative to the base plate.

6. An apparatus for lifting and moving a pallet rack having at least one upright frame with mounting points, the apparatus comprising:
   an outer telescoping tube and an inner telescoping tube, the inner telescoping tube comprising a lifting nut;
   a threaded rod extending through the lifting nut and the outer telescoping tube;
   a swiveling caster coupled to the inner telescoping tube;
   a thrust bearing affixed to the threaded rod, the thrust bearing forming a shoulder for driving the outer telescoping tube;
   an actuator coupled to the threaded rod, the actuator imparting rotational movement to the threaded rod;
   the outer telescoping tube comprises anchoring members for removable attachment to a flat, planar base plate, the base plate having a linear series of at least three bolt holes for attachment to the anchoring members, and a series of slots; and
   at least one L-bracket removably affixed to the planar base plate at the slots, the at least one L-bracket comprising a plurality of first attachment points for fixing the at least one L-bracket to the base plate in a slidably adjustable arrangement;

the at least one L-bracket also having a plurality of second attachment points, wherein the plurality of second attachment points are arranged on the at least one L-bracket such that at least one of the plurality of second attachment points aligns with at least one of the mounting points when the at least one L-bracket is positioned adjacent the at least one upright frame.

7. The apparatus of claim 6 wherein the flat, planar base plate comprises four attachment slots allowing the bracket to slide along the base plate without decoupling from the base plate.

8. The apparatus of claim 6 wherein the anchoring members of the outer telescoping tube comprises an upper anchoring member and a lower anchoring member for attaching to the flat, planar base plate, the lower anchoring member being larger than the upper anchoring member.

9. The apparatus of claim 6 further comprising an extension panel having panel slots for engaging the at least one L-bracket and for engaging the flat, planar base plate.

10. The apparatus of claim 6 further comprising a pin for removing the swiveling caster.

11. The apparatus of claim 6 further comprising a drive shaft coupling the actuator to the threaded rod.

12. An apparatus for lifting and moving a pallet rack having at least one upright frame with mounting points, the apparatus comprising:

an outer telescoping tube and an inner telescoping tube, the inner telescoping tube comprising a lifting nut;

a threaded rod engaging the lifting nut, the threaded rod further comprising a thrust bearing coupled to the threaded rod, such that rotating the threaded rod drives the lifting nut away from the thrust bearing;

a removable swiveling caster coupled to the inner telescoping tube;

an actuator coupled to the threaded rod, the actuator extending from the outer telescoping tube opposite the removable swiveling caster and configured to impart rotational movement to the threaded rod;

the outer telescoping tube further comprising an entirely flat planar anchoring member extending from the outer telescoping tube perpendicular to the threaded rod;

a base plate removably coupled to the anchoring member, the base plate having a series of bolt holes for attachment to the anchoring member and a series of slots; and a bracket removably affixed to the base plate, the bracket comprising a plurality of base plate attachment points configured to attach to the series of slots;

the bracket also having a plurality of bracket attachment points, wherein the plurality of bracket attachment points are arranged on the bracket such that at least one of the plurality of bracket attachment points aligns with at least one of the mounting points when the bracket is positioned adjacent the at least one upright frame.

* * * * *